March 30, 1971 R. E. MALTBY, JR., ET AL 3,573,026
APPARATUS FOR DEFLECTING SOFTENED GLASS SHEET
MATERIAL FROM ONE DIRECTION TO
ANOTHER DIRECTION OF DRAW Filed Feb. 26, 1968 2 Sheets-Sheet 1

INVENTORS
Robert E. Maltby, Jr.,
William E. McCown and
BY Eugene H. Heimrich

Collins & Oberlin
ATTORNEYS

March 30, 1971  R. E. MALTBY, JR., ET AL  3,573,026
APPARATUS FOR DEFLECTING SOFTENED GLASS SHEET
MATERIAL FROM ONE DIRECTION TO
ANOTHER DIRECTION OF DRAW
Filed Feb. 26, 1968  2 Sheets-Sheet 2
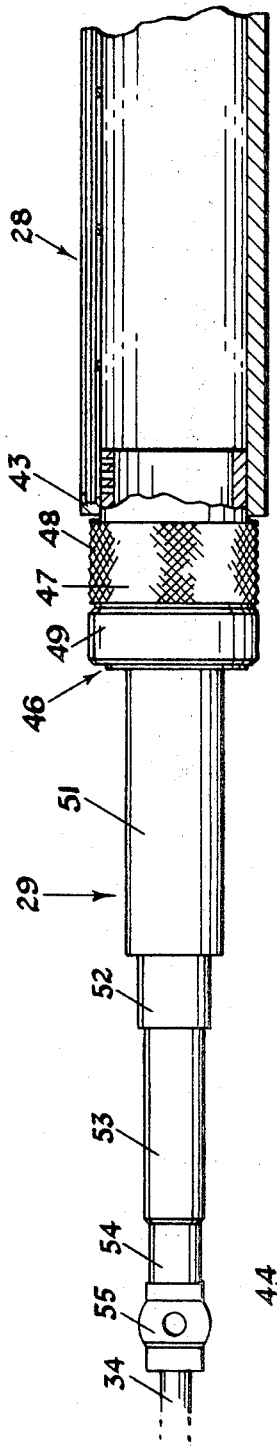
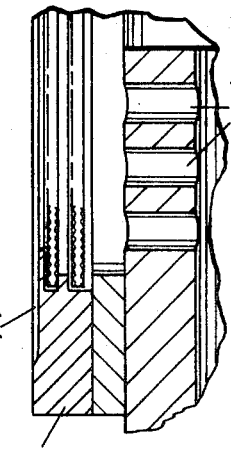
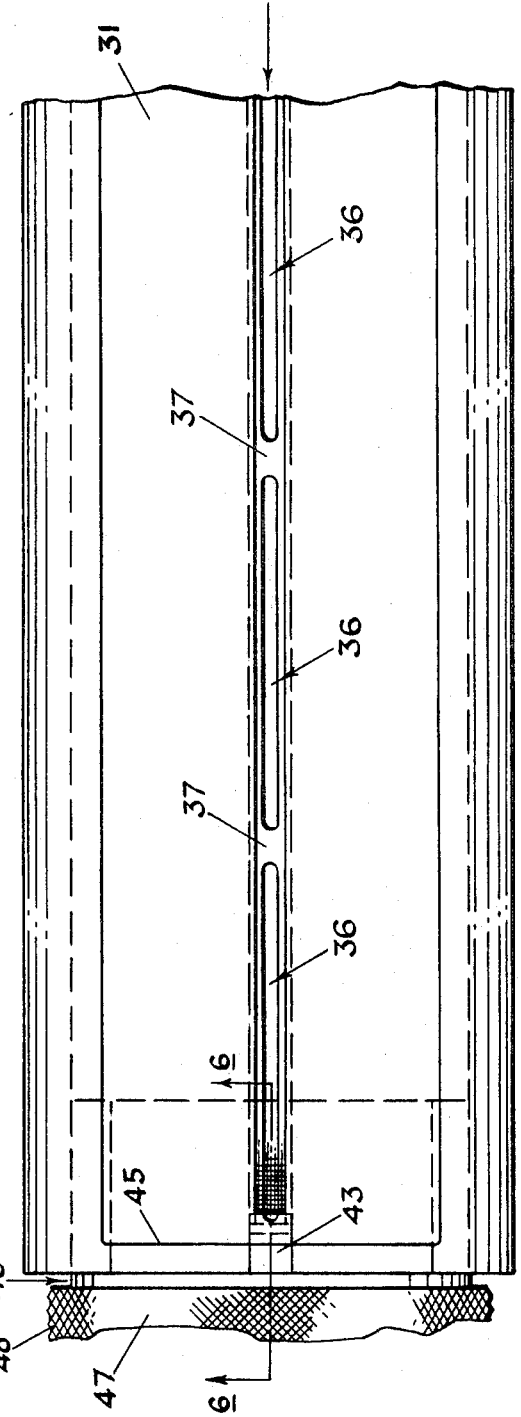
Fig. 4.
Fig. 5.
Fig. 6.
INVENTORS
Robert E. Maltby, Jr.,
William E. McCown and
BY Eugene H. Heimrich
Collins & Oberlin
ATTORNEYS

United States Patent Office 3,573,026
Patented Mar. 30, 1971

3,573,026
APPARATUS FOR DEFLECTING SOFTENED GLASS SHEET MATERIAL FROM ONE DIRECTION TO ANOTHER DIRECTION OF DRAW
Robert E. Maltby, Jr., Perrysburg, and William E. McCown and Eugene H. Heimrich, Toledo, Ohio, assignors to Libbey-Owens-Ford Company, Toledo, Ohio
Filed Feb. 26, 1968, Ser. No. 708,021
Int. Cl. C03b 15/04
U.S. Cl. 65—182                                    10 Claims

ABSTRACT OF THE DISCLOSURE

A device for supporting and conveying a continuous ribbon of pliable sheet material. The ribbon passes over a stationary curved member having a shallow recess formed in its surface, and an aeriform fluid is admitted to the recess under pressure to create a plenum beneath the ribbon whereby the ribbon is supported on a fluid film out of contact with the supporting member as it passes thereover.

BACKGROUND OF THE INVENTION

Field of the invention

The present invention relates broadly to the supporting and conveying of a continuous sheet or ribbon of pliable material, and more particularly to an improved means for supporting the sheet or ribbon of glass in a highly heated, plastic condition as it is drawn upwardly from a mass of molten glass and deflected into a substantially horizontal plane for passage through an annealing lehr in the so-called Colburn process of producing sheet or window glass.

Description of the prior art

As explained in U.S. Pat. No. 3,137,556, issued June 16, 1964, "window" or "sheet" glass, which is flat, drawn glass having fire polished surfaces attained during formation of the sheet as opposed to "plate" glass which has mechanically ground and polished surfaces, is produced in accordance with one well-known process by drawing a sheet or ribbon upwardly from a mass of molten glass and deflecting it over a so-called bending roll while in a highly heated, plastic condition. A major disadvantage of drawing sheet glass in this manner has been the adverse effect which the bending roll may have on the surface quality of the sheet. When the highly heated, plastic sheet comes in direct contact with the roll, slight imperfections in the roll surface imprint on the surface of the sheet to cause the undesirable condition known as bottom dirt, and the combination of these imperfections with the temperature of the roll and sheet cause an undesirable condition on the bottom surface of the sheet known in the art as sheen. Production speed is also limited by the amount of heat which can be removed from the sheet through contact with the bending roll.

In order to avoid this direct contact between the bending roll and sheet and thereby eliminate the undesirable effects upon the sheet occasioned thereby, it has been proposed in the above-identified U.S. patent to provide the roll with a porous surface through which an aeriform fluid is forced to create a film or cushion between the sheet and porous material. Thus the roll remains stationary while the sheet is moved thereover on the film. However, this has not proved entirely satisfactory in that it is extremely difficult to maintain a film of uniform thickness over the entire segment of roll surface about which the sheet is deflected. Thus, the sheet may drag across the roll surface in certain areas and balloon in other areas so that serious defects are created therein.

SUMMARY OF THE INVENTION

While the invention is illustrated and described herein with particular reference to production of window glass in accordance with the Colburn process, to which it is particularly well adapted, it will be understood that it is applicable to the supporting and conveying of pliable or flexible sheet material generally, such as plastic, paper, steel and cloth. One area in which it may find particular application, for example, is in removing the still plastic sheet of glass from the molten metal bath in the float process of producing glass. When thus employed, it is contemplated that a gas similar to or compatible with the nonoxidizing atmosphere of the float bath will be utilized as the aeriform fluid to support the sheet.

In accordance with the invention, a ribbon of glass is continuously drawn upwardly from a bath of molten glass and deflected about the curved surface of a stationary bending member into a substantially horizontal plane for passage through an annealing lehr. A shallow plenum chamber is formed beneath the sheet in the portion of the surface of the bending member about which the sheet is deflected. An aeriform fluid is supplied under pressure to the plenum chamber through a longitudinally extending slot in the bottom thereof, and the ribbon of glass is floated over the bending member and out of contact therewith on the cushion of fluid thus formed.

A primary object of the invention is to support and convey a highly heated glass sheet out of direct contact with a supporting surface until it has cooled sufficiently to be carried by conventional roll means without damage to its surface.

Another object of the invention is to support and convey a glass sheet in a highly heated, softened condition over a supporting device on a fluid cushion without causing ballooning or dragging of the sheet.

Another object is to thus support and convey the sheet using a minimum flow of aeriform fluid to maintain the fluid cushion.

Still another object is to minimize the volume of aeriform fluid escaping from between the sheet and the supporting device into the drawing chamber of the window glass machine.

Other objects and advantages of the invention will become more apparent during the course of the following description when taken in connection with the accompanying drawings.

BRIEF DESCRIPTION OF THE DRAWINGS

In the drawings, wherein like numerals are employed to designate like parts throughout the same:

FIG. 4 is a fragmentary elevational view of the bending member, partially in section;

FIG. 5 is a fragmentary plan view of the plenum area of the bending member; and

FIG. 6 is an enlarged fragmentary section taken substantially along line 6—6 of FIG. 5.

DESCRIPTION OF THE PREFERRED EMBODIMENTS

Figure 1:
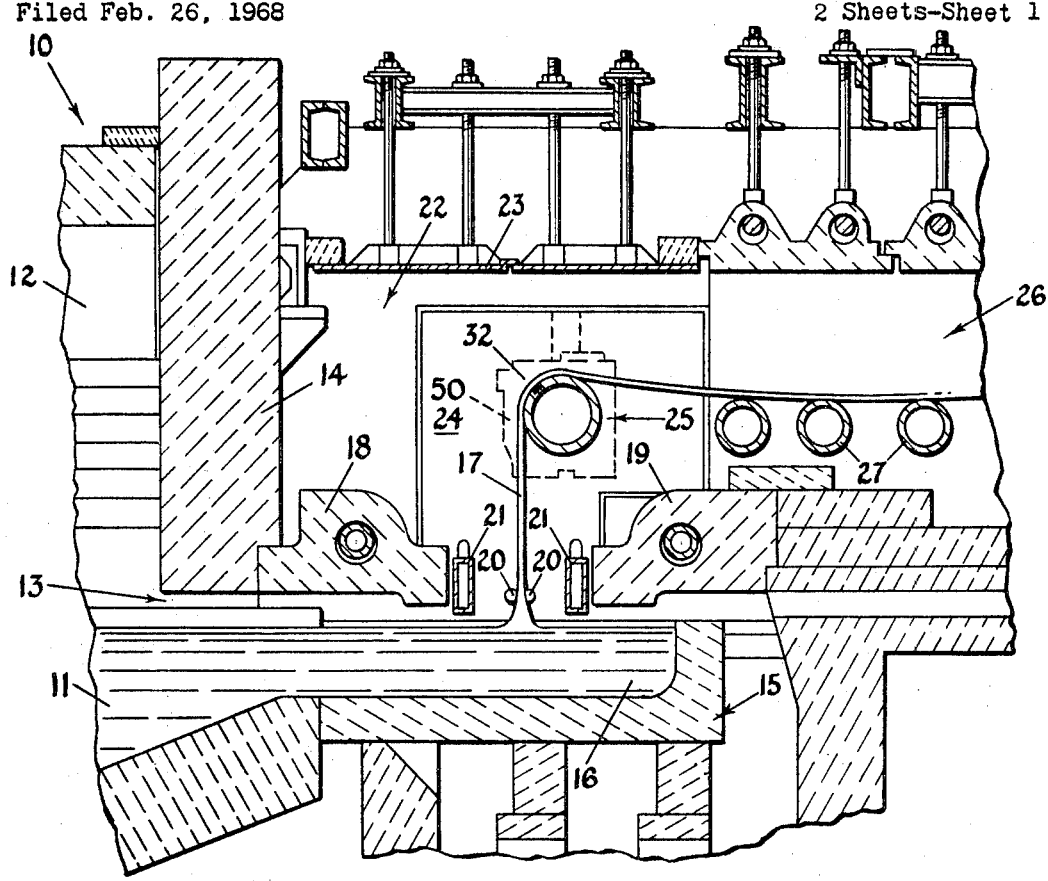
FIG. 1 is a longitudinal vertical section through the forming area of a sheet glass furnace embodying the invention.

Referring now to the drawings, and in particular to FIG. 1 thereof, there is shown generally at 10 the outlet end of the cooling chamber of a continuous tank furnace of any conventional or preferred construction in which a mass of molten glass is continuously produced, refined and cooled to proper working temperature. The molten glass, indicated at 11, flows from a cooling chamber 12 of the furnace through an opening 13 beneath a cooling chamber end wall 14 into a working receptacle 15 to form a relatively shallow pool of molten glass 16 from which is continuously drawn a sheet or ribbon 17. Front and rear lip tiles 18 and 19 located over the molten glass at the entrance end and rear, respectively, of the working receptacle create a quiescent zone over the molten glass through which the sheet is drawn during its formative stage.

Pairs of knurled rolls 20 conventionally engage the sheet along either marginal edge to establish and maintain it at the proper width, and coolers 21 are located opposite either surface in the usual fashion to absorb heat from the sheet by radiation as it is drawn upwardly. The sheet 17 rises vertically for a short distance within the drawing chamber, designated generally at 22 and comprising the end wall 14, a roof 23 and opposite side walls 24, and is then deflected about a bending member 25 for passage through an adjacent annealing lehr 26 on a series of aligned lehr or machine rolls 27. Since the invention is concerned only with the area in which the sheet is deflected from a vertical plane to a substantially horizontal plane about the bending member 25 for movement into and through the annealing lehr, only the portion of the furnace necessary for a proper understanding of the invention has been shown and described.

Figure 2:
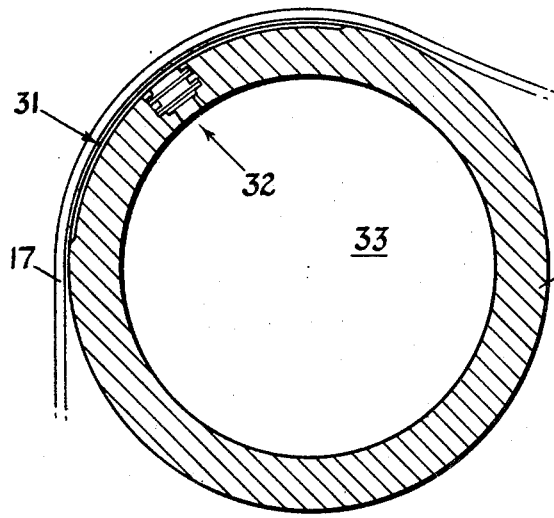
FIG. 2 is an enlarged transverse sectional view of the bending member illustrated in FIG. 1.

The bending member 25 is mounted in journals for rotation about its longitudinal axis and is provided with a drive mechanism in the manner of conventional bending rolls for a purpose to be hereinafter described. More particularly, as shown in FIGS. 2 and 4, the bending member is generally cylindrical in shape and includes a tubular central sheet supporting section 28 having affixed to its ends trunnion sections 29 for mounting it in operative position within said journals.

In floating the sheet on a cushion of aeriform fluid as it is deflected about the bending member so that its surface is not damaged, it is essential that it be supported uniformly so as to avoid both dragging over the bending member and ballooning. The aeriform fluid escaping from between the bending member and sheet enters the drawing chamber, and thus should be minimized in order to prevent the formation of harmful air currents in the zone of sheet formation. Such turbulence may adversely affect temperature conditions within the molten glass and the newly formed sheet. Should the fluid escape at a relatively rapid rate, difficulty may be encountered in replenishing it to maintain the fluid cushion. Thus, there are certain advantages in at least approximating static conditions within the fluid cushion.

To this end the tubular central section 28 of the bending member 25 comprises a hollow cylinder 30 having a relatively shallow plenum chamber 31 formed on the segment of its outer surface about which the sheet is deflected. While the tubular section 29 has been illustrated as being circular in cross section, it will be appreciated that the principle of the invention might also be applied to bending members having other cross sectional configurations. An opening or fluid supply slot 32 extending longitudinally within the plenum chamber communicates with the hollow interior 33 of the cylinder. Aeriform fluid is supplied to the hollow interior 33 at a suitable temperature and pressure through the ends of the trunnion sections by means of conduits 34 as will be hereinafter described.

The diameter of the tubular section 28 is dependent upon a number of factors such as the particular material being conveyed thereover, its thickness, weight, temperature and plasticity. However, for producing sheet glass in accordance with the invention, an outside diameter ranging from about 9 to 21 inches has been found suitable. The wall thickness of the tubular member may be on the order of 1 inch, and the slot from ½ to 1 inch in width.

The fluid supply slot 32 includes an upper continuous recess 35 extending throughout the length of the tubular member, and a plurality of spaced openings 36 providing communication between the recess and the hollow interior 33. Strengthening ribs 37 separate the adjacent openings 36, although it is contemplated that the ribs may be omitted to provide a completely unobstructed slot, if desired, to improve the fluid flow characteristics.

Figure 3:
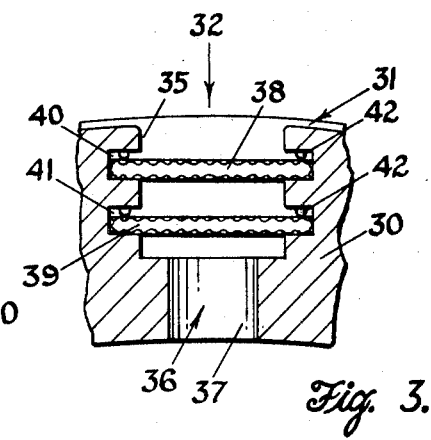
FIG. 3 is an enlarged fragmentary transverse sectional view of the plenum chamber portion of the bending member, showing baffle means positioned within the fluid supply slot.

It will be appreciated that the glass is at a high temperature and its surfaces are extremely susceptible to damage as it passes over the bending member, so that if individual streams of fluid are allowed to impinge thereon with sufficient intensity, longitudinally extending lines or streaks may be detected in the finished product. It has also been found that if the fluid is allowed to pass through the supply slot 32 completely unhindered, pressure fluctuations within the plenum chamber 31 due to fluttering or bouncing of the sheet tend to be transmitted to and amplified by the fluid within the hollow interior 33 of the bending member. In order to diffuse the fluid so that it does not impinge upon the under surface of the sheet in directed streams, and to create a pressure drop between the hollow interior 33 and the plenum chamber 31, baffle means may be provided within the fluid supply slot. It will be appreciated that the baffle means may assume a variety of forms. One form of such baffle means, as best illustrated in FIG. 3, includes spaced superimposed screens 38 and 39 or other porous or foraminous members positioned within the continuous recess 35 and having their opposite edges received in upper and lower pairs of grooves 40 and 41, respectively, in the side walls of the recess. A sealing member 42, such as a length of wire, is wedged into each groove to hold the screen in position and insure that fluid does not leak around the edges of the screens within the grooves to impinge against the undersurface of the sheet in directed streams.

With an arrangement of this type, the bottom screen is preferably more dense than the top screen or, in other words, the top screen has greater porosity than the bottom one. The screens thus create a pressure drop to damp out pressure fluctuations in the fluid between the interior of the bending member and the plenum 31. The upper, more porous screen breaks up jets created by the lower screen. Screen porosity or density may be defined in terms of the volume of air in cubic feet per minute at standard temperature and pressure which will pass through a one square foot specimen of the screen with a pressure drop of 0.1 p.s.i. Based upon such a definition, good results have been achieved using a 250 c.f.m. lower screen in combination with a 500, 750, or 1000 c.f.m. top screen. Likewise, good results have been achieved using a 500 c.f.m. lower screen in combination with a 750 or 1000 c.f.m. screen.

In order to facilitate insertion of the screens or other baffles, the recess 35 and the grooves 40 and 41 extend to the ends of the cylinder 30. The screens can thus be inserted longitudinally from the ends of the grooves. After the screens are in place, the ends of the recess are closed by plugs 43 inserted therein as by a light press fit. Should it become necessary to replace the screens, the plugs can be removed to provide access thereto. As will be evident in FIGS. 5 and 6, the top surface of the plug is recessed at 44 to conforms with the configuration of the shallow plenum chamber 31.

The recessed plenum chamber stops somewhat short of the ends of the cylinder 30, so that a lip 45 completely surrounds the plenum where it is recessed into the outer surface of the cylinder. Thus, as a glass sheet of slightly greater width than the length of the cylinder passes thereover, a substantially closed chamber exists beneath the sheet.

As illustrated in FIGS. 1 and 2, the bending member 25 is elevated slightly about the lehr rolls 27 so that the sheet 17 follows the contour of the bending member for somewhat more than 90° of arc on its outer surface. The elevation of the bending member above the surface of the pool of molten glass 16 may vary depending upon the thickness and speed of the sheet being produced and the rate at which it cools before reaching the bending member. In order to minimize the fluid loss therefrom, the plenum is of such extent that the sheet follows the contour of the cylinder 30 for a short distance beyond the lips 45 as it approaches and departs. As the sheet is supported on the fluid body in the plenum chamber, sufficient fluid escapes over the lip 45 to prevent the sheet from contacting the lip and the adjacent roll surface outside the area of the chamber. It has been found that the chamber should cover an arc from about 85° to 95° on the roll surface with a conventional lehr arrangement as illustrated in FIG. 1 in order to properly support the sheet out of contact with the bending member. The depth of the chamber is preferably in the range from about .025 inch to .090 inch or more. For example, in a bending member with a cylindrical section 30 having a diameter of 18 inches and positioned with its top 3 inches above the first lehr roll 27, a chamber 31 with a depth of about .055 inch and covering an arc of 92° on the cylindrical surface has been found suitable for supporting a sheet of ordinary window glass.

Inserted in either end of the hollow cylinder 30 is a tubular extension 46 upon which is carried a freely rotatable sleve 47. The sleeve has a knurled surface 48 upon which the marginal edges of the sheet ride in passing over the bending member. The sleeves are suitably journalled on the tubular extensions as by the use of a pair of concentric stellite rings (not shown) adjacent either end thereof with the outer ring secured to the sleeve and the inner ring secured to the tubular extension. The sleeves, which are freely rotatable in response to passage of the glass sheet thereover, are driven by the sheet, and the friction between the sleeves and the marginal edges of the sheet is sufficient to stabilize the sheet and prevent it from narrowing or necking in as it is deflected about the bending member. The width of the ribbon is established by the pairs of knurled rolls 20, and this width is maintained and the shet is guided as it passes over the bending member on the fluid film by having its margins ride upon the sleeves 47.

Since the marginal portions of the sheet which ride upon the knurled sleeves are distorted and must be removed as waste, it is desirable to minimize the width of the sleeves and the marginal areas of the sheet which ride thereon. For example, it has been found that with a sheet width on the order of 150 inches, a marginal bend of 5 or 6 inches riding on the knurled sleeve is adequate to maintain the width of and guide the sheet. Even though the knurled sleeve may be on the order of 10 inches in width, it is conceivable that the edges of the sheet may, on occasion, extend outwardly beyond the knurled sleeve. In order to prevent the sheet from becoming fouled in the event this should happen, there is affixed to the tubular extension 46 outwardly of the sleeve a stationary collar 49. Thus, should the sheet extend beyond the rotatable sleeve 47, its margin will slide over the stationary collar.

The ends of the tubular extension 47 extend into the hollow cylinder 30 some distance in order to provide a joint of suitable strength, and consequently may overlap the ends of the fluid supply slot 32. Ready access for the fluid from the interior of the bending member to the slot in the region of overlap is provided by a plurality of holes 46' in the wall of the tubular extension 46 beneath the slot.

During normal operation, the bending member remains stationary with the sheet moving over the plenum chamber on the fluid cushion as will be hereinafter described. However, it is contemplated that the device may be operated in the manner of a conventional bending roll during installation, starting of the sheet, and at such other times as operating difficulties are encountered. For this purpose, the bending member is mounted at one end in a conventional bending roll drive system with overriding clutch as shown generally in broken lines at 50 in FIG. 1, and the other end is journalled and supported in the usual manner (not shown) for bending rolls. More particularly, the trunnion sections 29 are affixed to the tubular extensions 46 and include reduced tubular intermediate segments 51 and 52 joined to a bearing section 53. The bearing section is received in the journals as above-described at either end for supporting the bending member. A pipe extension 54 is secured to the outer end of each bearing section, and rotary couplings 55 on the pipe extensions at either end of the bending member are connected through the aforementioned conduits 34 to a source (not shown) of properly conditioned air or other aeriform fluid under pressure.

Briefly reviewing the operation of the invention, the bending member is installed in the machine and operated initially as a conventional bending roll. When the sheet is stabilized, a suitble aeriform fluid such as ordinary air preheated to a temperature from about 500° to 1400° F. is admitted to the hollow interior 33 of the bending member through its ends by the conduits 34. Rotation is then discontinued with the fluid supply slot 32 positioned intermediate the points of tangency where the sheet approaches and departs from the bending member, whereupon a body of the fluid builds up in the plenum chamber to support the sheet out of contact with the cylindrical member 30. The temperature and pressure of the preheated fluid and the angular position of the plenum are then adjusted to support the sheet with a minimum flow of fluid.

In one embodiment found to perform satisfactorily in production trials, a bending member having a cylindrical portion 30 with an outside diameter of 18¼" was provided with a fluid supply slot ⅝ inch in width. The plenum chamber was .027 inch in depth and covered an arc of 44° on either side of the centerline of the slot. The baffle means within the slot comprised a lower screen 39 having a rating of 500 c.f.m. and an upper screen having a rating of 750 c.f.m. The height of the bending member above the lehr rolls was varied between ¼ inch and 2½ inches, and the centerline of the slot 32 was varied between 42° and 49° from vertical. Air preheated to a temperature in the range from 1065° to 1130° F. was supplied to the interior 33 of the cylindrical portion at a volume from 82 c.f.m. to 130 c.f.m.

The height of the roll above the lehr and position of the slot should be adjusted so that the wrap of the sheet around the bending member beyond the lip 45 of the plenum chamber gives the best results, this generally being in the neighborhood of 1° to 4° of arc on the surface. In another embodiment of the invention with similar dimensions the plenum chamber has a depth of .055 to .060 inch and extends over an arc of 46° on either side of the centerline of the fluid supply slot.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

We claim:
1. In apparatus for producing glass in sheet form, a working receptacle containing a mass of molten glass and means for continuously drawing a sheet upwardly from said mass of molten glass, said drawing means including a bending member positioned above the working receptacle and having a curved surface about which the sheet is deflected into a substantially horizontal plane, the improvement comprising a shallow plenum chamber in the curved surface beneath the sheet of slightly less extent than the area of said surface about which said sheet is de- flected, and means introducing an aeriform fluid into said plenum chamber under pressure to support said sheet out of contact with said curved surface.

2. Apparatus for producing glass in sheet form as claimed in claim 1, including a longitudinally extending slot in said curved surface within the plenum chamber through which the aeriform fluid is admitted to said plenum chamber.

3. Apparatus for producing glass in sheet form as claimed in claim 2, including baffle means positioned within said slot for diffusing the aeriform fluid and creating a pressure drop therein as said fluid passes through said slot.

4. Apparatus for producing glass in sheet form as claimed in claim 1, wherein said plenum chamber covers an arc in the range from 85° to 95° on said curved surface.

5. Apparatus for producing glass in sheet form as claimed in claim 4, wherein said bending member is positioned with the centerline of said slot inclined between 42° and 49° from vertical and with said sheet adapted to follow said curved surface from 1° to 4° beyond the extremities of said plenum chamber.

6. Apparatus for producing glass in sheet form as claimed in claim 1, wherein said plenum chamber has a depth in the range from about .025 to .090 inch.

7. Apparatus for producing glass in sheet form as claimed in claim 1, including a rotatable sleeve at each end of said curved surface upon which the marginal edges of the sheet are carried as said sheet is deflected about said bending member.

8. Apparatus for producing glass in sheet form as claimed in claim 1, wherein said bending member is tubular in cross section, and said means introducing the aeriform fluid comprises a longitudinally extending slot in said tubular member within said plenum chamber, said slot providing communication between said plenum chamber and the interior of said tubular member, and means supplying said aeriform fluid to said interior of said tubular member.

9. Apparatus for producing glass in sheet form as claimed in claim 8, including means mounting said tubular member for rotation about its longitudinal axis at selected times.

10. In apparatus for deflecting a heated ribbon of glass in plastic condition from a first path along which it is advancing into a second path displaced from said first path, including a stationary curved surface about which the ribbon is deflected following the contour thereof from said first path into said second path, the improvement comprising a relatively shallow plenum chamber in said curved surface beneath said ribbon substantially coextensive with but of slightly less extent than the area of said surface about which said ribbon is deflected, and means for introducing an aeriform fluid to said plenum chamber under pressure so as to support said ribbon on a fluid cushion out of contact with said curved surface.

References Cited

UNITED STATES PATENTS

| 1,547,797 | 7/1925 | Ewing | 65—194X |
| 3,476,539 | 11/1969 | McCown et al. | 65—196X |

ARTHUR D. KELLOGG, Primary Examiner

U.S. Cl. X.R.

65—194, 196